United States Patent [19]

Hansen et al.

[11] Patent Number: 4,770,504
[45] Date of Patent: Sep. 13, 1988

[54] MAGNETO-OPTICAL LIGHT SWITCHING ELEMENT AND METHOD OF MANUFACTURING SAME

[75] Inventors: Peter Hansen, Appen; Claus-Peter Klages, Hamburg; Klaus-Peter Schmidt, Quickborn; Wolfgang F. M. Tolksdorf, Tornesch; Klaus Witter, Hamburg, all of Fed. Rep. of Germany

[73] Assignee: U.S. Philips Corp., New York, N.Y.

[21] Appl. No.: 21,104

[22] Filed: Mar. 3, 1987

[30] Foreign Application Priority Data

Mar. 6, 1986 [DE] Fed. Rep. of Germany ....... 3607345

[51] Int. Cl.⁴ .......................... G02F 1/01; G02B 5/30
[52] U.S. Cl. ..................................... 350/355; 350/377
[58] Field of Search ............... 350/353, 355, 375, 376, 350/377

[56] References Cited

U.S. PATENT DOCUMENTS

| | | | |
|---|---|---|---|
| 3,787,825 | 1/1974 | De Jonge | 350/376 X |
| 4,082,424 | 4/1978 | Sauter | 350/375 X |
| 4,273,609 | 6/1981 | Nelson et al. | 156/624 |
| 4,379,853 | 4/1983 | Mateika et al. | 252/62.57 X |
| 4,500,177 | 2/1985 | MacNeal | 350/376 |
| 4,544,239 | 10/1985 | Shone | 350/376 |
| 4,578,651 | 3/1986 | Heitmann et al. | 350/375 X |

OTHER PUBLICATIONS

Klages et al., "LPE Growth of Bismuth Substituted Gadolinium Iron Garnet Layers: Systematization of Experimental Results", J. of Crystal Growth, 64 (1983), pp. 275-284.
"LISA ein neuer magneto-optischer Druckkopf", VALVO Technische Information, published prior to 3/3/87.

Primary Examiner—Eugene R. LaRoche
Assistant Examiner—Nathan W. McCutcheon
Attorney, Agent, or Firm—Thomas A. Briody; Jack E. Haken; William L. Botjer

[57] ABSTRACT

A magneto-optical light switching element comprising islands which are formed from an epitaxial layer on the basis of bismuth-substituted rare earth metal iron garnet, which layer is provided on a magnetically unordered, optically transparent, (111)-oriented garnet substrate, integrated heating resistors being provided on the islands which are surrounded by a coil, the epitaxial layer being grown from a melt which contains lead oxide and boron oxide as a flux, the boron content of the melt used for growing the epitaxial layer being in the range from 12.7 to 25 at % (cation content) and the coil being constructed as an integrated coil.

16 Claims, 3 Drawing Sheets

MAGNETO-OPTICAL LIGHT SWITCHING ELEMENT AND METHOD OF MANUFACTURING SAME

The invention relates to a magneto-optical light switching element comprising islands which are formed from an epitaxial layer on the basis of bismuth-substituted rare earth metal iron garnet, which layer is provided on a magnetically unordered, optically transparent, (111)-oriented garnet substrate, integrated heating resistors being provided on the islands which are surrounded by a coil, the epitaxial layer being grown from a melt which contains lead oxide and boron oxide as a flux.

The invention further relates to a method of manufacturing such a magneto-optical light switching element and to its use.

For processing texts, graphs and pictures ever more use is made of electronic data processing. To display the information, fast, high-resolution printers such as, for example, electrophotographic printers having optical printing heads are used.

In Technische Information 840716 published by Valve, a magneto-optical light switching module is described which can suitably be used for the formation of such compact, optical, high-resolution printing heads.

The known modules contain a series of punctiform light switching elements which can independently be switched between a transparent and an opaque condition in a thermomagnetic way.

In the manufacture of the light switching elements use is made of a (111)-oriented monocrystal line substrate of substituted gadolinium gallium garnet. By means of epitaxy, a layer of Bismuth-substituted rare earth metal iron garnet of the qualitative composition $(Gd, Bi)_3 (Fe, Ga, Al)_5 O_{12}$ is applied to this substrate. Such layers and substrates are known from J. Cryst. Growth 64 (1983), pages 275 to 284. To obtain single light switching elements, most of the magneto-optical layer initially covering the entire substrate is removed by means of a photolithographic masketching process, so that only single islands remain. Each island forms the basis of a light switching element. In a further masking process the interval between the light switching elements is covered with an opaque layer. Consequently, only the light switching elements transmit light. During the time that the substrate is magnetically unordered and optically inactive, the magneto-optical layer exhibits a spontaneous magnetization which due to the non-statistic distribution of the bismuth ions in the crystal lattice is always oriented perpendicularly to the layer surface, that is to say the magnetisation can only take two directions: either parallel or antiparallel to the normal to the layer.

When linearly polarized light passes through this layer, the plane of polarization of this light is rotated either clockwise or anti-clockwise, dependent upon the direction of magnetization, due to the Faraday effect. This rotation of the plane of polarization is converted to an intensity modulation by a polarization-sensitive optical system. To this end the layer is arranged between two polarizing foils, that is to say foils which only transmit light of a predetermined plane of polarization. The first foil (polarizer) serves to filter linearly polarized light from the incident light and the second foil (analyser) serves to block the light of one of the planes of polarization. Light whose plane of polarization corresponds to the other direction of magnetization is transmitted by the light switching elements.

Consequently, a reversal of the direction of magnetization leads to a change-over from the opaque condition to the transparent condition or conversely.

So long as the dimensions of the light switching element do not exceed a critical value of approximately 500 μm, a uniform direction of magnetization is always formed within a light switching element. With light switching element dimensions of approximately 100 μm, as they are used for printing head applications, the direction of magnetization is very stable.

On the other hand, the directional stability of the magnetization is temperature-dependent, at temperatures over 150° C. the stability decreases sharply. This effect is used for switching. To this end, a resistor element is provided by means of the thin-film technology in one corner of each light switching element and is connected via a track network to an electronic driver circuitry. Moreover, a coil formed of a readily conceived wire turn is arranged so that it surrounds all light switching elements of a light switching array. A light-switching element is switched by applying a current impulse of typically 15 μs to the resistor. As a result thereof, the temperature in the vicinity of said resistor element (heating element) rises to over 150° C., thereby strongly reducing the magnetization stability in the material below the resistor element. By means of a coil a magnetic field of approximately 20 ka/m is then produced for approximately 10 μs. Under the influence of said field the magnetization in the heated area is directed towards the external magnetic field. In this way a "nucleus" for a new magnetic domain is formed. This will grow under the influence of the magnetic field which remains activated for a few more microseconds, until it covers the entire light switching element, thereby again exhibiting a uniform magnetization.

For the proper functioning of such a light switching element the amount of Faraday rotation, the compensation temperature and the lattice constant of the epitaxial layer, as well as the so-called uniaxial magnetic anisotropy $k_u$ of the layer material are of great importance. Experience has shown that epitaxy layers of bismuth-substituted yttrium or gadolinium iron garnet which are grown in (111)-direction, exhibit a substantial degree of positive growth-induced anisotropy $K_u$ which increases in the case of layers deposited from a predetermined melt as the bismuth content is higher. A positive anisotropy $K_u$ ensures that the magnetization vector is perpendicular to the layer surface, as is required for the proper functioning of the light switching elements described above. On the other hand, in a thermomagnetic switching process the force which determines the preferred direction of magnetization must be overcome by an external magnetic field. Due to the material used so far for the manufacture of the known light-switching elements, this so-called magnetic switching field is so large that it can only be produced by a wire-wound coil which is provided around the magneto-optical islands by means of hybrid technology, and not by an integrated coil because its cross-section is too small, as a consequence of which the current density is raised.

The necessity of a separate production cycle for the manufacture of the coil renders magneto-optical light switching element expensive and the electronic drive circuitry for producing the necessary high currents is relatively costly. A further disadvantage of the use of a separate wire-wound coil is that due to power dissipation in the coil wire the switching rate of the single light switching elements is limited to an array frequency of 2 kHz.

SUMMARY OF THE INVENTION

It is an object of the invention to so improve the magneto-optical light switching element mentioned in the opening paragraph that its growth-induced uniaxial anisotropy $K_u$, which determines the switching characteristics of the magneto-optical light switching element, is reduced without changing the Faraday rotation, and that its manufacture is simplified substantially.

This object is achieved in accordance with the invention, in that the boron content of the melt employed for growing the epitaxial layer is in the range from 12.7 to 25 at. % (cation content) and the coil is constructed as an integrated coil.

A method of manufacturing such a magneto-optical light switching element is characterized in that an epitaxial layer of a melt on the basis of bismuth-substituted rare earth metal iron garnet having a boron content in the range from 12.7 to 25 at % (cation content) is deposited on a magnetically unordered, optically transparent, (111)-oriented garnet substrate, in that islands are formed from the epitaxial layer by means of a photolithographic process, in that an integrated electric heat resistor is provided on each island, and in that an integrated coil which surrounds the islands is subsequently provided on the substrate.

The invention makes use of the recognition that smaller magnetic switching fields can be used to switch epitaxial magneto-optical layers in a thermomagnetic switching process when the growth-induced uniaxial anisotropy is reduced, and that the relatively high values of the growth-induced magnetic anisotropy $K_u$, which exhibit the known magneto-optical, (111)-oriented epitaxy layers of bismuth-substituted rare earth metal iron garnet, can be reduced substantially when in addition to lead oxide boron oxide is added as a flux to the melt from which the epitaxial garnet layer is grown, the boron content being higher, however, than in the known melts. Despite the higher boron content, the amount of Faraday rotation and the compensation temperature are the same in the inventive magneto-optical layers as in the known layers which are grown from melts with a lower boron content.

The advantages of the invention reside in particular in that owing to the reduced uniaxial anisotropy of the magneto-optical garnet material, whilst maintaining the Faraday rotation at the known high values, a relatively small external magnetic switching field is sufficient to overcome the force which determines the preferred direction of magnetization in a thermomagnetic switching process. Such a magnetic switching field may be produced by an integrated coil which is provided on the substrate by a photolithographic process. The possibility of using an integrated coil is very advantageous to, in particular, industrial-scale production, in that at least sixty arrays having each more than 500 magneto-optical light switching elements can simultaneously be provided with a coil, thereby achieving an important reduction in production costs.

Moreover, thanks to a more favourable geometry (smaller distances to the light switching elements) of an integrated thin-film coil in comparison with a wire-wound coil, a desired magnetic switching field can be produced with less than 50% of the coil current necessary for operating a wire-wound coil. Consequently, as the power dissipation of an integrated coil is reduced, undesired heating of the light switching elements is reduced.

The lower degree of growth-induced magnetic anisotropy provides the additional advantage of a further reduction in coil current.

BRIEF DESCRIPTION OF THE FIGURES

The invention will now be explained in more detail with reference to an exemplary embodiment and a drawing, in which.

DESCRIPTION OF THE PREFERRED EMBODIMENT

By means of isothermal epitaxy on horizontally fixed rotating substrates, bismuth-substituted gadolinium iron garnet layers were deposited on (111)-oriented calcium magnesium zirconium-substituted gadolinium gallium garnet substrates (GGCMZ) having a lattice constant $a_s = 1.250$ nm. After the melt from which the epitaxial layers are to be grown has homogenized for several hours, the temperature of the melt is lowered to the growth temperature and the substrate is fixed to a platinum support and positioned horizontally over the melt at a distance of 10 mm. After approximately 3 minutes the substrate has attained the required growth temperature, and it is immersed 30 to 40 mm in the melt and rotated immediately, the direction of rotation being reversed every 2.5 s. To stop the growth process, the substrate is pulled out of the melt and any melt residue is largely spun off by a fast rotating movement. Epitaxial layers having a layer thickness of 4.7 μm were deposited on a ≈0.5 mm thick substrate. Table 1 lists the composition of one of the melts used in this exemplary embodiment, the cation content being indicated in at. %. $T_S$ designates the saturation temperature.

TABLE I

| Pb | Bi | B | Fe | Gd | Ga | Al | $T_S(K)$ |
|---|---|---|---|---|---|---|---|
| 35.11 | 31.38 | 16.55 | 13.88 | 0.83 | 0.53 | 1.72 | 1085 |

Table II lists the composition, manufacturing parameters and properties of the layer (layer $L'_{111}$) grown in accordance with the melt of Table I, which data are compared with those of an epitaxial bismuth-substituted rare earth metal iron garnet layer of a melt having a boron content of 12.17 at. % in accordance with the present state of the art (layer $L_{111}$). Both layers were deposited on (111)-oriented (GGCMZ) substrates.

TABLE II

|  | $T_S$ (K) | $\Delta T_S$ (K) | $\|\Delta a^\perp\|$ (nm) | $T_K$ (K) | $\theta_F$ (degree/cm) | d ($\mu$m) | $K_u$ (J/m$^3$) |
| --- | --- | --- | --- | --- | --- | --- | --- |
| Layer $L_{111}$ $Gd_{2.04}Bi_{0.96}Fe_{4.45}Ga_{0.20}Al_{0.35}O_{12}$ | 1093 | 42 | <0.0005 | 269 | 15000 | 4.7 | $5 \cdot 10^3$ |
| Layer $L'_{111}$ $Gd_{2.01}Bi_{0.99}Fe_{4.43}Ga_{0.19}Al_{0.38}O_{12}$ | 085 | 20 | <0.0005 | 273 | 15000 | 4.7 | $2.5 \cdot 10^3$ |

$T_S$ = Saturation temperature
$\Delta T_S$ = supercooling
$|\Delta a^\perp|$ = lattice mismatch
$T_K$ = compensation temperature
$\theta_F$ = Faraday rotation at a wavelength of 633 nm
d = Layer thickness
$K_u$ = growth-induced magnetic anisotropy constant The values listed in table II show that, although melts with different boron oxide contents were used as fluxes, for example the values of the Faraday rotation and the compensation temperature were almost equal. This does not hold for the values of the growth-induced uniaxial anisotropy $K_u$: the value of the inventive layer is substantially lower than that of the known layer.

Figure 1A:
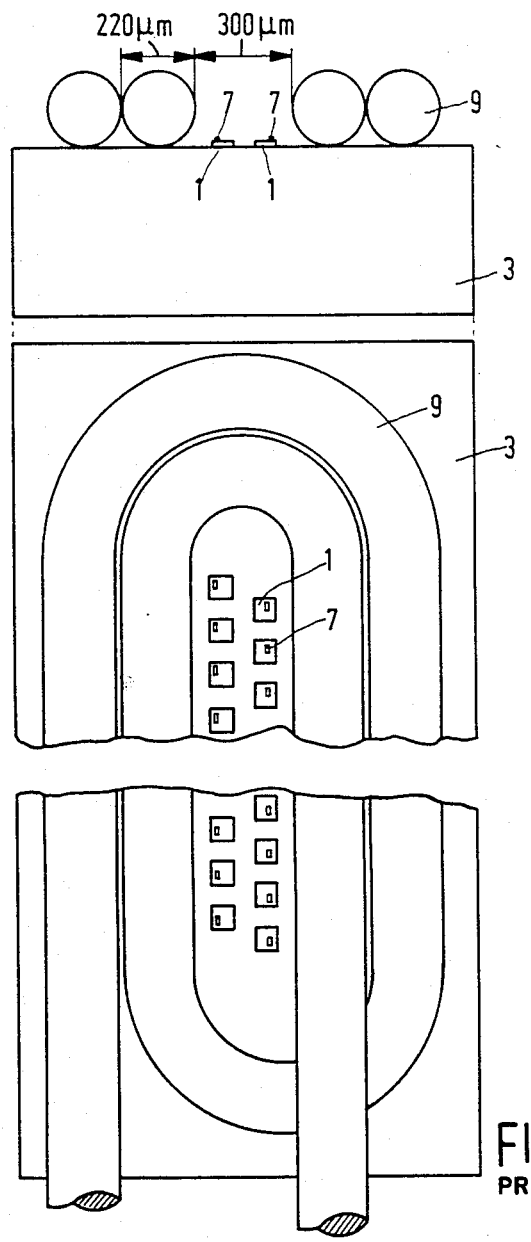
FIG. 1a is a sectional view and a plan view of a substrate having light switching elements with an external wire-wound coil (state of the art).
Figure 1B:
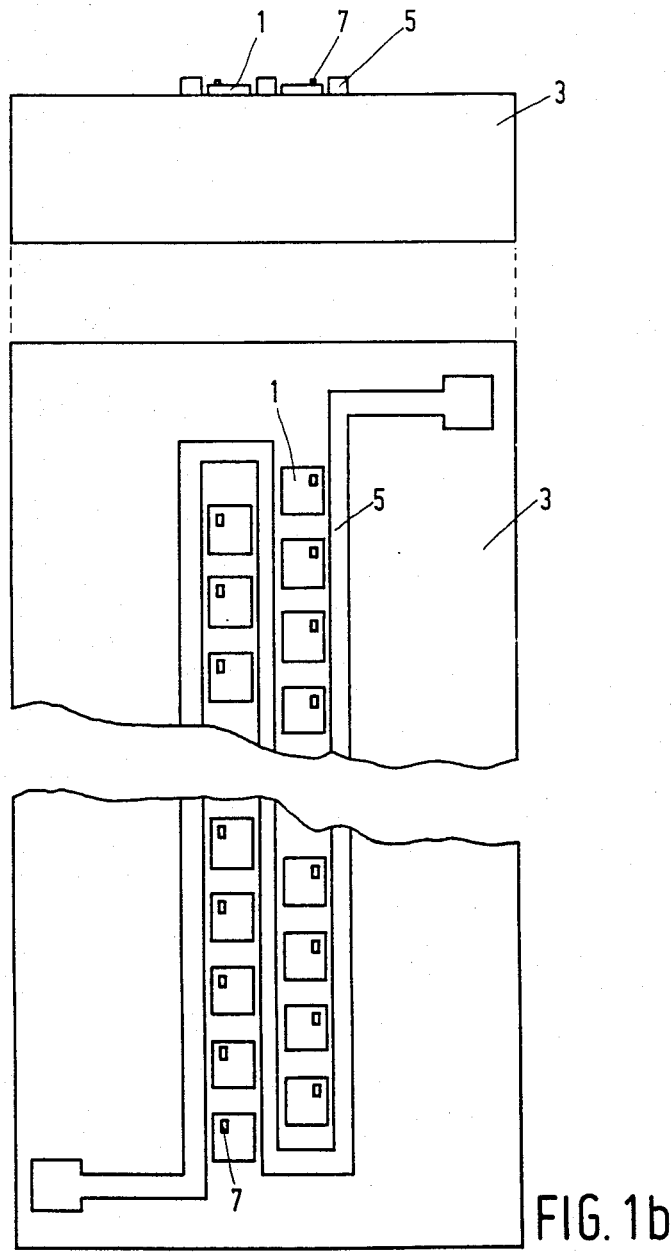
FIG. 1b is a sectional view and a plan view of a substrate having light switching elements with an integrated thin-film coil in accordance with one embodiment of the invention.

FIG. 1b is a sectional view and a plan view of a part of a light switching array having a plurality of magneto-optical light switching elements on a magnetically unordered (GGCMZ) garnet substrate 3. By means of a photolithographic process, islands 1 having a border length of $\approx 100$ $\mu$m were etched from 4.7 $\mu$m thick, epitaxial, bismuth-substituted rare earth metal-iron-garnet layers which were manufactured as described above, which islands are surrounded by a meander-shaped coil 5 which is manufactured by means of thin-film technology, and which has a layer thickness of $\approx 10$ $\mu$m and a track width of $\approx 50$ $\mu$m. Heating resistors 7 which are also manufactured by means of thin-film technology are provided on the islands 1. The switching parameters were measured at the location of the light switching array, as shown in detail in FIG. 1a, which contains a plurality of light switching elements, and whose magnetic switching field was produced by means of a two-turn wire-wound coil 9.

Figure 2:
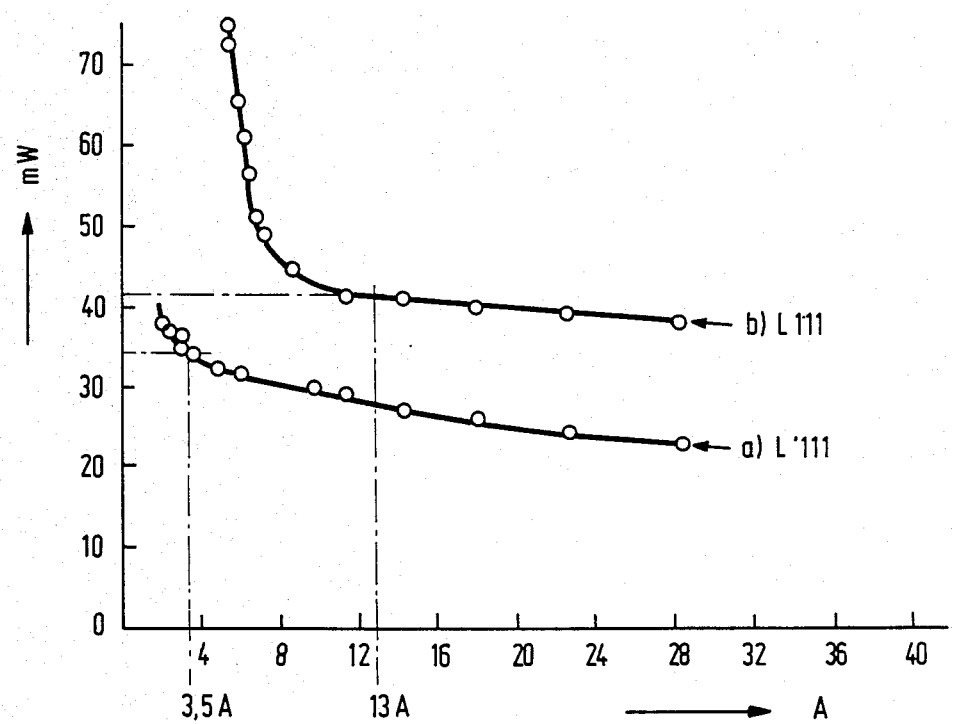
FIG. 2 is a diagram plotting the dependence of the heating capacity upon the current in an external wire-wound coil (a) for a magneto-optical light switching element in accordance with an embodiment of the invention, and (b) for a magneto-optical light switching element in accordance with the state of the art.

In accordance with Table II, FIG. 2 depicts the thus measured switching characteristics of light switching elements having layers according to the invention ($L'_{111}$) and according to the state of the art ($L_{111}$), the required heating capacity being shown as a function of the current in the magnetic coil. The coil current is plotted on the horizontal axis of the diagram and is indicated in A, the heating capacity is plotted on the vertical axis and is indicated in mW. The data are measured at 298° K. The heating pulse and the magnetic pulse were both 16 $\mu$s. The overlap was 2.5 $\mu$s. Both layer materials exhibit a distinctive threshold value of the current in the coil. Below said threshold value the required heating capacity increases substantially. The light switching elements can only be operated at coil currents over said threshold value, because a greater heating capacity substantially reduces the life cycle of the heating resistors. FIG. 2 shows that the threshold value of the light switching elements having the inventive layer $L'_{111}$ is situated at a coil-current level which is substantially below that of a light switching element having a layer $L_{111}$ in accordance with the present state of the art. The layer $L_{111}$ necessitates a coil current of 13 A, whereas the light switching element having the layer $L'_{111}$ can be switched with a coil current of 3.5 A.

As there is a square-Law relationship between the current and the power dissipation of the coil, there is at 3.5 A only 7% left of the original power dissipation. Moreover, the reduction in the necessary heating capacity results in a longer service life of the integrated heating resistors.

The possibility of employing an integrated meander-shaped thin-film coil leads to a substantial reduction in power dissipation of the magnetic coil in comparison with a magnetic coil which is formed of wire turns. In the case of a track width of 50 $\mu$m, a thickness of 10 $\mu$m, a length of 10.5 cm, a resistivity of $3 \cdot 10^{-6}$ $\Omega$cm and a current of 1.5 A the integrated coil has a power dissipation of 1W. This value applies to the light switching element with the layer $L'_{111}$ having an array frequency of 3 kHz and a magnetic pulse width of $2 \times 12$ $\mu$s. The use of a light switching element having an $L_{111}$ layer would require a current of 5.6A; this would lead to a heat dissipation of $\approx 14$W which gives rise to thermal-control problems in an integrated coil and to the destruction of the light switching array. For this reason, the known light switching elements on the basis of a $L_{111}$ layer can only be switched by means of an external wire-wound coil which has a small resistance due to its relatively large wire cross-section and which can be operated with a sufficiently small power dissipation of $\approx 5$W.

What is claimed is:

1. A magneto-optical switching element comprising:
   a magnetically unordered, optically transparent, (111)-oriented garnet substrate;
   a plurality of islands formed from an epitaxial layer on said substrate, said layer formed on the basis of bismuth-substituted rare earth metal iron garnet, grown from a melt which contains lead oxide and boron oxide as a flux, said boron content being in the range from 12.7 to 25 at. % (cation content);
   a plurality of heating resistors disposed on said plurality of islands; and
   an integrated coil formed on said substrate having turns which surround said islands, said integrated coil generating a magnetic flux which in combination with heat produced by said heating resistors, controls light passage through said islands.

2. A magneto-optical light switching element as claimed in claim 18 wherein the epitaxial layer consists of bismuth-substituted rare earth metal (SE) iron garnet in accordance with the general formula (SE, Bi)$_3$(Fe, Ga, Al)$_5$O$_{12}$.

3. A magneto-optical light switching element as claimed in claim 2, wherein the composition of the epitaxial layer is in accordance with the formula $Gd_{2.01}Bi_{0.99}Fe_{4.43}Ga_{0.19}Al_{0.38}O_{12}$.

4. A magneto-optical light switching element as claimed in claim 3, wherein the cation content of the melt used for growing the epitaxial layer has the following values:

Pb 35.11; Bi 31.38; B 16.55; Fe 13.88; Gd 0.83; Ga 0.53; Al 1.72.

5. A magneto-optical light switching element as claimed in claim 1 wherein the substrate consists of rare earth metal gallium garnet.

6. A magneto-optical light switching element as claimed in claim 5, wherein the substrate consists of calcium magnesium zirconium-substituted gadolinium gallium garnet (GGCMZ) of the general formula $(Gd,Ca)_3(Ga,Mg,Zr)_5O_{12}$.

7. A magneto-optical light switching element as claimed in claim 5, wherein the substrate consists of calcium magnesium zirconium-substituted neodymium gallium garnet of the general formula $(Nd,Ca)_3(Ga,Mg,Zr)_5O_{12}$.

8. A method for manufacturing a magneto-optical light switching element comprising:
   forming a melt on the basis of bismuth-substituted rare earth metal iron garnet having a boron content in the range from 12.7 to 25 at. % (cation content);
   depositing an epitaxial layer of said melt on a magnetically unordered, optically transparent, (111)-oriented garnet substrate;
   forming a plurality of islands from said epitaxial layer using a photolithographic process;
   forming an integrated heating resistor on each island; and,
   forming an integrated coil which surrounds said islands on said substrate.

9. A method as claimed in claim 8 wherein a rare earth metal gallium garnet is used as a substrate.

10. A method as claimed in claim 9, wherein a calcium magnesium zirconium-substituted gadolineum gallium garnet (GGCMZ) of the general formula $(Gd,Ca)_3(Ga,Mg,Zr)_5O_{12}$ is used as a substrate.

11. A method as claimed in claim 9, wherein a calcium magnesium zirconium-substituted neodymium gallium garnet of the general formula $(Nd,Ca)_3(Ga,Mg,Zr)_5O_{12}$ is used a substrate.

12. A method as claimed in claim 8, wherein an epitaxial layer of bismuthsubstituted rare earth metal (SE) iron garnet in accordance with the general formula $(SE,Bi)_3(Fe,Ga,Al)_5O_{12}$ is deposited on the substrate.

13. A method as claimed in claim 12, wherein an epitaxial layer having a composition in accordance with the formula $Gd_{2.01}Bi_{0.99}Fe_{4.43}Ga_{0.19}Al_{0.38}O_{12}$ is deposited on the substrate.

14. A method as claimed in claim 13, in that for growing the epitaxial layer a melt is used having the following cation content in at %: Pb 35.11; Bi 31.38; B 16.55; Fe 13.88; Gd 0.83; Ga 0.53; Al 1.72.

15. A method as claimed in claim 8 wherein the deposited epitaxial layer has a layer thickness in the range from 1 to 10 $\mu$m.

16. A method as claimed in claim 8 wherein islands having a border length up to 500 $\mu$m are formed from the epitaxial layer.

* * * * *